(12) United States Patent
Gibson

(10) Patent No.: US 7,197,846 B1
(45) Date of Patent: Apr. 3, 2007

(54) FISHING LURE

(76) Inventor: James W. Gibson, 807 - 3rd St., NW., Massillon, OH (US) 44647

( * ) Notice: Subject to any disclaimer, the term of this patent is extended or adjusted under 35 U.S.C. 154(b) by 556 days.

(21) Appl. No.: 10/299,645

(22) Filed: Nov. 18, 2002

Related U.S. Application Data

(60) Provisional application No. 60/377,179, filed on Apr. 30, 2002.

(51) Int. Cl.
A01K 85/10 (2006.01)
A01K 85/14 (2006.01)

(52) U.S. Cl. .................... 43/42.11; 43/42.08; 43/42.11; 43/42.5

(58) Field of Classification Search .............. 43/42.04, 43/42.08, 42.11, 42.13, 42.14, 42.15, 42.16, 43/42.17, 42.19, 42.36, 42.37, 42.4, 42.02, 43/42.03, 42.05, 42.23, 42.49, 42.29, 42.3, 43/42.41, 42.5, 42.51, 42.52
See application file for complete search history.

(56) References Cited

U.S. PATENT DOCUMENTS

| 1,731,161 | A | * | 10/1929 | Farley ........................ 43/42.13 |
| 1,820,887 | A | * | 8/1931 | Pflueger .................... 43/42.29 |
| 1,866,623 | A | * | 7/1932 | Crow ......................... 43/42.5 |
| 1,888,641 | A | * | 11/1932 | Toepper ...................... 43/42.4 |
| 1,978,875 | A | * | 10/1934 | Wright ...................... 43/42.29 |
| 1,987,839 | A | * | 1/1935 | Moilanen ................... 43/42.04 |
| 2,025,270 | A | * | 12/1935 | Chaney ...................... 43/42.47 |
| 2,203,473 | A | * | 6/1940 | Shannon .................... 43/42.06 |
| 2,214,266 | A | * | 9/1940 | Haury ....................... 43/42.52 |
| 2,215,764 | A | * | 9/1940 | Okesson et al. ........... 43/42.19 |
| 2,374,279 | A | * | 4/1945 | Fugler ....................... 43/42.13 |
| 2,444,707 | A | * | 7/1948 | Mather ....................... 43/26.2 |
| 2,509,179 | A | * | 5/1950 | Warnock .................... 43/42.3 |
| 2,549,458 | A | * | 4/1951 | Grimm ...................... 43/42.13 |
| 2,589,932 | A | * | 3/1952 | Farley ....................... 43/42.08 |
| 2,593,027 | A | * | 4/1952 | Ilmari ....................... 43/42.06 |
| 2,700,240 | A | * | 1/1955 | Gibbs ......................... 43/42.4 |
| 2,780,884 | A | | 2/1957 | Hadfield |
| 2,785,495 | A | | 5/1957 | Douglass |
| 2,795,076 | A | * | 6/1957 | Luft .......................... 43/42.39 |
| 2,819,552 | A | * | 1/1958 | Russell, Jr. .................. 43/42.2 |
| 2,895,252 | A | * | 7/1959 | Tibbetts ...................... 43/42.5 |
| 2,948,984 | A | * | 8/1960 | Crawford ................... 43/42.39 |
| 3,002,311 | A | * | 10/1961 | Kyper ....................... 43/42.04 |
| 3,133,373 | A | * | 5/1964 | Jeffers ....................... 43/42.41 |

(Continued)

FOREIGN PATENT DOCUMENTS

FR 2302035 * 10/1976

OTHER PUBLICATIONS

Bass Pro Shops—Master Catalog—Spring 2002—pp. 122-205.

Primary Examiner—David Parsley
(74) Attorney, Agent, or Firm—Zollinger & Burleson Ltd.

(57) ABSTRACT

A fishing lure resists flipping over while in fast rough water being fished at different speeds so the person fishing the lure can control the action of the lure to simulate natural bait when fishing at different depths, including close to the bottom. One embodiment provides a spoon-shaped body having a hook extending from the rear of the body. A shank assembly is slidably disposed through the body. Another embodiment provides a spoon-shaped body having a hook extending from the rear of the body. A shank assembly is slidably disposed through the body with spinning blades attached to the upper and lower ends of the shank assembly.

32 Claims, 3 Drawing Sheets

U.S. PATENT DOCUMENTS

| | | | | |
|---|---|---|---|---|
| 3,169,337 | A | * | 2/1965 | McGregor .................. 43/42.09 |
| 3,494,062 | A | * | 2/1970 | Gardner ..................... 43/42.04 |
| 3,724,117 | A | * | 4/1973 | Flanagan, Jr. ............. 43/42.24 |
| 3,747,256 | A | * | 7/1973 | Haddock ................... 43/42.13 |
| 3,869,821 | A | * | 3/1975 | McGahee .................. 43/42.49 |
| 3,918,192 | A | * | 11/1975 | Rabideau .................. 43/42.17 |
| 4,507,892 | A | * | 4/1985 | Ochs ........................ 43/42.18 |
| 4,571,877 | A | * | 2/1986 | Montgomery ............. 43/42.11 |
| 4,771,567 | A | * | 9/1988 | Cannon .................... 43/42.26 |
| 4,773,180 | A | * | 9/1988 | Shimizu .................... 43/42.11 |
| 4,962,610 | A | * | 10/1990 | Bleam et al. ................ 72/457 |
| D314,223 | S | | 1/1991 | Anderson |
| 5,058,309 | A | * | 10/1991 | Firmin ....................... 43/42.13 |
| 5,070,640 | A | * | 12/1991 | McGahee .................. 43/42.52 |
| D335,913 | S | | 5/1993 | Norris |
| 5,379,543 | A | * | 1/1995 | Avent ........................ 43/42.15 |
| 5,930,941 | A | * | 8/1999 | Hayes, II et al. .......... 43/42.13 |
| D421,638 | S | | 3/2000 | Yount |
| 6,158,162 | A | * | 12/2000 | Loniello .................... 43/42.13 |
| 6,266,914 | B1 | * | 7/2001 | Johnson et al. ............ 43/42.13 |
| 6,374,535 | B1 | * | 4/2002 | Bailey ....................... 43/42.11 |

* cited by examiner

A patent document page.

FISHING LURE

CROSS REFERENCE TO RELATED APPLICATIONS

This application claims priority from U.S. Provisional Patent Application Ser. No. 60/377,179 filed Apr. 30, 2002; the disclosures of which are incorporated herein by reference.

BACKGROUND OF THE INVENTION

1. Technical Field

The invention generally relates to fishing lures. More particularly, the invention relates to a fishing lure used to hold artificial bait in a manner that prevents the artificial bait from flipping over in the water at various speeds while allowing the artificial bait to have a wobbling nutation action that will attract fish. Specifically, the invention relates to a lure having a wire main shank that loosely and slidably passes through a substantially spoon shaped body in a manner that keeps a hook connected to the spoon pointing upward.

2. Background Information

Known fishing lures that are designed to be used with attached artificial baits are known to flip over while fishing at various speeds causing undesirable line twist. Further, an artificial bait does not look natural to the target fish when it keeps flipping over. When the lure flips over, the hook has a tendency to catch on weeds and get hung up on obstructions or the bottom. The problem of flipping over, and twisting the fish line, along with collecting weeds, still exists when artificial baits are trolled or retrieved fast, or during, stream, and river fishing where water currents are prevalent. Most artificial baits have little action on their own and do not produce sound. These baits thus have a limited fish-attraction range and other devices must be used to create additional action and sound.

BRIEF SUMMARY OF THE INVENTION

The invention provides a fishing lure that may be fabricated in a wide range of sizes having the same basic design that may be used with many different types and shapes of artificial bait for fresh water and salt water fishing conditions. The invention provides a lure that will attract fish by action and sound and resist flipping over while in fast rough water being fished at different speeds so the person fishing the lure can control the action of the lure to simulate natural bait when fishing at different depths, including close to the bottom.

One embodiment of the invention provides a spoon-shaped body having a hook extending from the rear of the body. A shank assembly is slidably disposed through the body.

Another embodiment of the invention provides a spoon-shaped body having a hook extending from the rear of the body. A shank assembly is slidably disposed through the body with spinning blades attached to the upper and lower ends of the shank assembly.

The invention also provides an embodiment wherein a hook is attached to a spoon-shaped body in a manner that consistently points the hook upwardly and forwardly with respect to the spoon shaped body.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
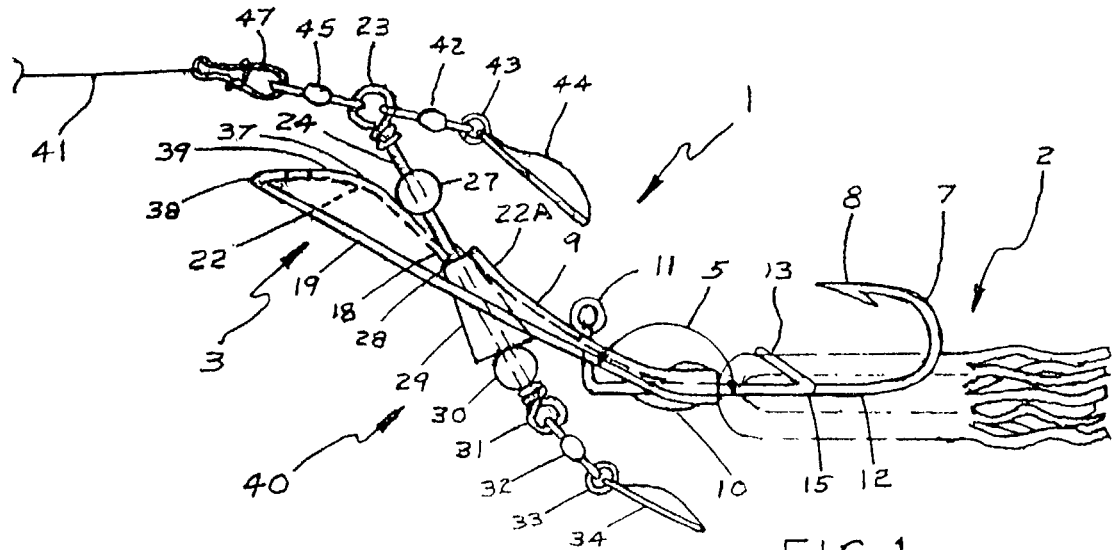
FIG. 1 is a side elevation view of an embodiment of a fishing lure according to this invention, particularly illustrating a substantially spoon shaped body with an artificial bait attached to a jig hook and a fishing line attached in a first configuration.

The fishing lure 1 of this invention generally includes a substantially spoon shaped body 3, a hook 7 extending from body 3, and a shank assembly 40 extending through body 3. Lure 1 is adapted to "swim" through the water to attract fish. In one embodiment, lure 1 is used to hold an artificial bait 2 in a manner that creates a movement for bait 2 as bait 2 and lure 1 move through the water. Lure 1 may also be used with live baits. Lure 1 with the fishing line attached as described in the three configurations described below, when drawn through the water with the attached artificial bait, has a wobbling nutation action that simulates live bait and it also has a similar action as it drops to a lower depth in the water. If the retrieve is stopped in open water, the lure normally eventually drops to the bottom and when the retrieve is continued, it will plane back up toward the surface until it reaches its normal running depth for that particular retrieval rate.

Figure 2:
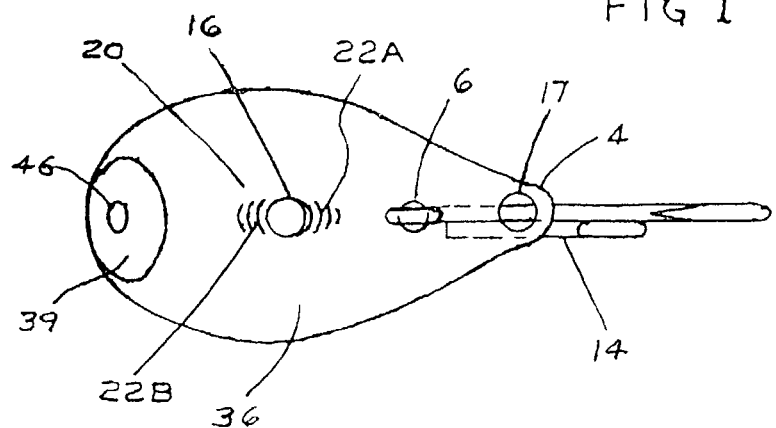
FIG. 2 is a top view of said fishing lure according to this invention. This top view particularly illustrates said substantially spoon shaped body, with said jig hook and a bait retaining wire, in position to be soldered.

When view from above as shown in FIG. 2 body 3 may be said to be tear drop-shaped or shaped like a tear drop with a widened middle portion. Body 3 generally defines a convex surface 9 that is also referred to as the top or upper surface of body 3. Body 3 also defines a concave lower surface that is also the underside of body 3. Body 3 further defines a substantially planar lower edge 19 along its major portion.

Figure 3:
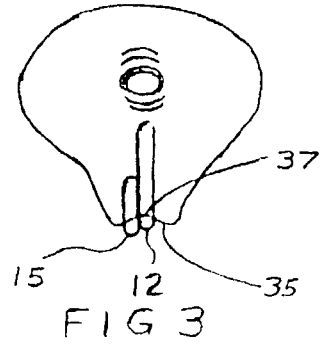
FIG. 3 is an end view of the fishing lure according to this invention. This end view particularly illustrates the concave bottom on the small shaped end of said substantially spoon shaped body.

In one embodiment provided for the purpose of describing the non-limiting best mode now understood by the inventor, body 3 has a small shaped end 4 shaped upward at an obtuse angle 5 of approximately 150 degrees measured with respect to the lower edge 19 of substantially spoon shaped body 3. Small shaped end 4 of substantially spoon shaped body 3 has a concave-shaped underside 35 (FIG. 3) with an indented depression 37 in the center that is used for centering a shank 12 of a jig hook 7 before shank 12 is connected to concave-shaped underside 35. Small shaped end 4 defines a first hole 17 configured to receive solder 10 to connect shank 12 to body 3.

Body 3 defines a second hole 6 adapted to receive jig hook 7. Hole 6 receives jig hook 7 so a barbed hook point 8 enters the substantially spoon shaped body 3 from convex upper surface 9. A jig hook eye 11 larger than hole 6 rests against convex upper surface 9 and helps hold hook 7 in place.

A retaining wire 14 with an acute angular end 15 is used to retain an artificial bait 2 in position. Wire 14 is placed next to shank 12 of jig hook 7 so the apex of the acute angular shaped end 15 points to the curved aft end of the jig hook 7 and the tip 13 of retaining wire 14 points upward and forward. Jig hook 7 and retaining wire 14 are soldered 10 to body 3 so hook point 8 is disposed approximately upward toward convex side 9 of body 3. A minimum of solder 10 is required for strength because jig hook eye 11 cannot be pulled through hole 6.

Artificial bait 2 is attached to jig hook 7. Artificial bait 2 is threaded or slid forward on the jig hook shank 12 so it catches on tip 13 of retaining wire 14. Retaining wire 14 retains artificial bait 2 in a preferred position relative to substantially spoon shaped body 3 and jig hook 7.

A third hole 16 is disposed through substantially spoon shaped body 3 in the approximate center of a wide area 36. The location of hole 16 helps to balance lure 1 and is used to produce a wobbling nutation action. Hole 16 is sized large enough to not restrict the movement of the substantially spoon shaped body 3 more than is needed to keep the substantially spoon shaped body 3 from rotating. The substantially concave shaped underside 22 of body 3 adjacent to hole 16 toward end 4 is tilted upward as shown at 22A. The convex area 20 adjacent to the hole 16 toward the forward end 38 is shaped downward 22B creating a concave shaped depression 20 on convex upper surface 9 ahead of the hole 16. Upper surface 9 extends forward and downward behind forward end 38. Convex surface 9 above forward end 38 of body 3 has an optional substantially flattened area 39 that allows lure 1 to run deeper in the water.

A fourth hole 46 is disposed through the substantially spoon shaped body 3 between third hole 16 and forward end 38.

Shank assembly 40 is slidably and loosely disposed through third hole 16. The connection between shank assembly 40 and body 3 allows lure 1 to wobble and nutate when drawn through the water. The connection also helps prevent lure 1 from twisting. A fishing line 41 is attached to lure 1 in a first configuration with a first swivel 45. First swivel 45 is attached in a swivel type connection to a top eyelet 23 located at the upper end of the main shank 24 of shank assembly 40. Primarily this configuration is used most, casting, jigging, dropping and underwater retrieving. When retrieved steadily, the fishing lure normally runs approximately two or more feet below the surface, depending on the retrieval rate. The wire main shank with the components attached stabilizes the lure so the hook point remains upright and resists flipping over, and the fishing lure with the attached artificial bait has a wobbling nutation action, when drawn through the water.

In the embodiment of the invention depicted in the drawings, a second swivel 42 is also connected to top eyelet 23. Second swivel 42 is optional and can be used to mount a small blade 44 that is attached to second swivel 42 with a ring 43. Blade 44 may be spoon-shaped and tear-drop shaped. Blade 44 may also be designed to spin when lure 1 is drawn through the water.

A first bead 27 is slidably received on main shank 24 between body 3 and eyelet 23. First bead 27 is larger than hole 16 and cannot wedge itself into hole 16. A second bead 29 is slidably disposed on main shank 24 under body 3 such that body 3 is trapped between second bead 29 and first bead 27. Second bead 29 may be conical and designed to bear against underside 22 when lure 1 is being fished. The small end 28 of conical second bead 29 may engage the edge of the depressed front 18 of hole 16. A third bead 30 is slidably received on the wire main shank 24 under second bead 29. Third bead 30 is thus disposed between second bead 29 and the lower end of shank 24.

A lower eyelet 31 is connected or formed from the lower end of shank 24. Eyelets 23 and 31 may be formed in any suitable manner, e.g. by twisting the end of the wire forming the main shank 24 into a loop and then clinching this end to the main shank 24. A third swivel 32 may be connected to lower eyelet 31. A small ring 33 may be attached to the unattached end of swivel 32. A small blade 34 may be attached to ring 33.

The weight of the substantially spoon shaped body 3 with jig hook 7 is kept to a minimum so as not to affect the action of the attached bait 2. A heavier weighty conical bead 29 or a heavier weighty spherical bead 30 is added on the wire main shank 24 below the substantially spoon shaped body 3 if more weight is required. An allowance is made to the length of the wire main shank 24 so the substantially spoon shaped body 3 can move lengthwise on the wire main shank 24. The length of the allowance is limited so the top eyelet 23 on the wire main shank 24 is approximately adjacent to the front end 38 of the substantially spoon shaped body 3 when all of the components are installed on the wire main shank 24 and the bottom eyelet 31 is completed. The wire main shank 24 contains the substantially spoon shaped body 3 loosely and slidably and the lure 1 and the attached bait 2 have a wobbling nutation action and resists rotation.

Figure 4:
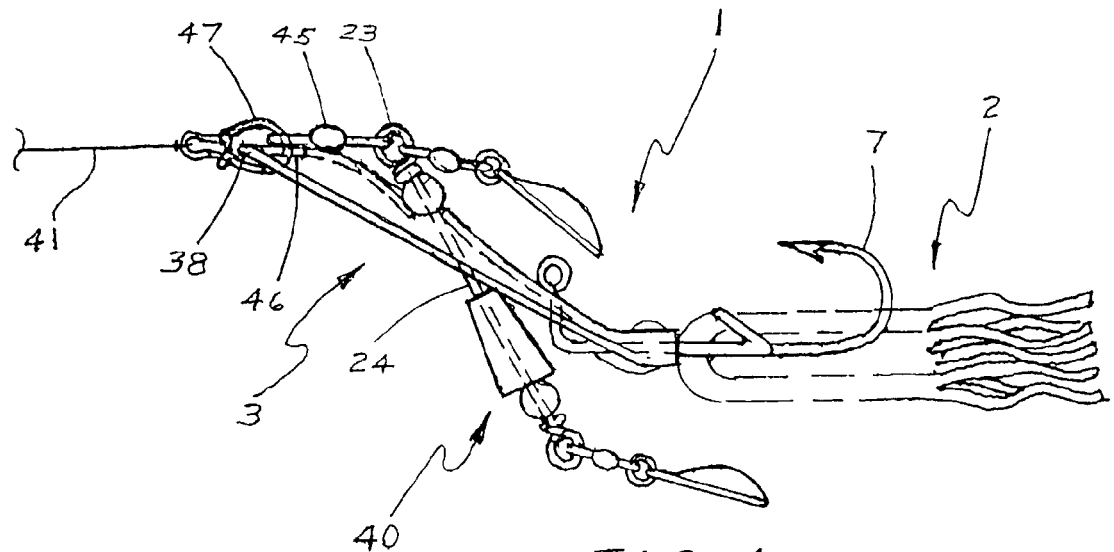
FIG. 4 is a side elevation view of an embodiment of a fishing lure according to this invention, particularly illustrating a substantially spoon shaped body with an artificial bait attached to a jig hook and a fishing line attached in a second configuration.
Figure 5:
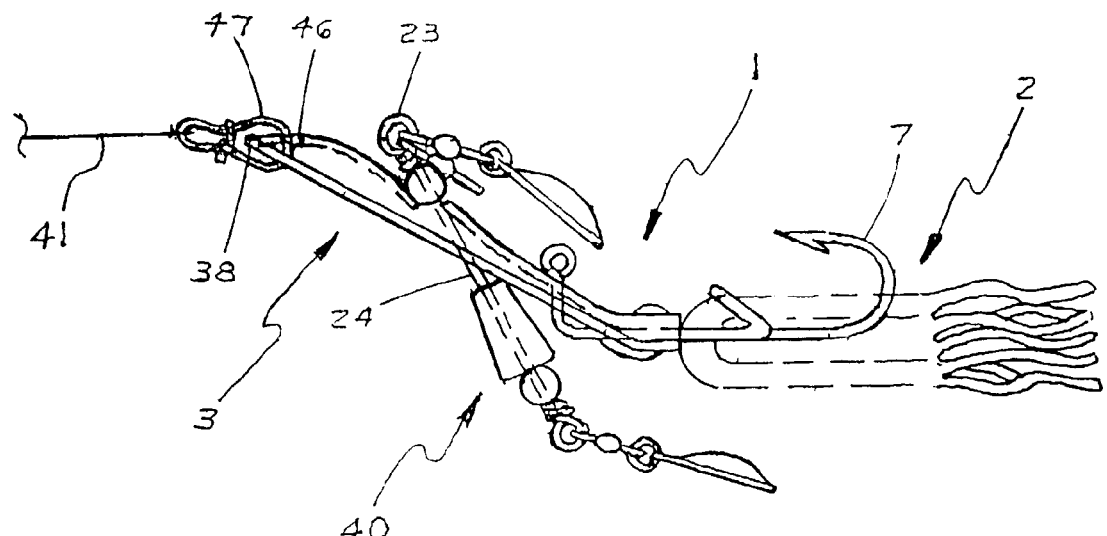
FIG. 5 is a side elevation view of an embodiment of a fishing lure according to this invention, particularly illustrating a substantially spoon shaped body with an artificial bait attached to a jig hook and a fishing line attached in a third configuration.
Figure 6:
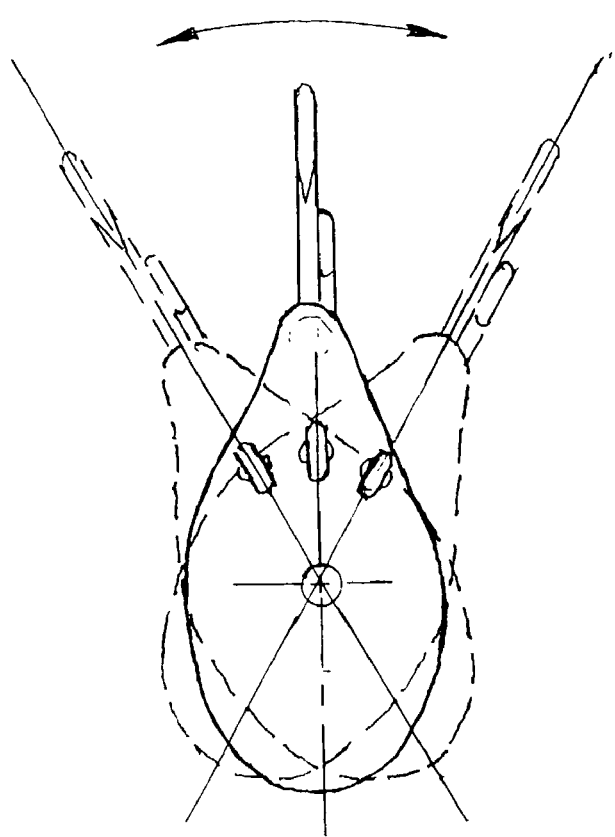
FIG. 6 is a top view of said substantially spoon shaped body, illustrating in dotted lines the lateral nutation motion, assumed by said lure, when drawn through the water.
Figure 7:
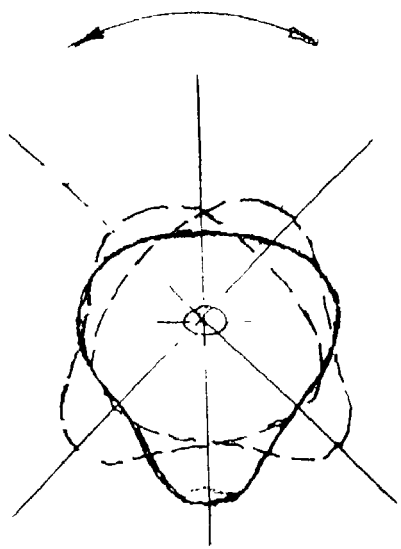
FIG. 7 is a front view of said substantially spoon shaped body, illustrating in dotted lines the lateral wobbling motion, assumed by said lure, when drawn through the water.

Fishing line 41 can be attached to lure 1 in a second configuration by connecting shank assembly 40 to body 3 as shown in FIG. 4. A snap ring 47 attaches swivel 45 to body 3. Thus, the orientation of swivel 45 may change relative to snap ring 47 and wire main shank 24 and is not fixed. Main shank 24 is contained loosely and slidably through body 3. This second configuration results in a neutral depth effect required for many types of trolling and surface fishing. When retrieved steadily, fishing lure 1 normally runs on or close to the surface, so it can be fished over heavy surface weed beds, without getting caught on front lip 38. Substantially spoon shaped body 3, with the attached jig hook 7 that points upward, resists getting caught on the weeds. Main shank 24 with the components attached stabilizes the lure 1 so it remains upright and doesn't flip over and fishing lure 1 with attached artificial bait 2 also has a wobbling nutation action and simulates natural bait.

Further, fishing line 41 may be attached to body 3 directly to fourth hole 46 with ring 47. In this configuration, shank assembly 40 is connected loosely and freely to body 3. This configuration allows main shank 24 to move independent of the clips that attach fishing line 41. This configuration results in characteristics similar to said second configuration, plus lure 1 has a more active wobbling nutation action.

A fourth configuration of the same embodiment provides line 41 connected to eyelet 11 of jig hook 7. This balances lure 1 with the attached artificial bait attached. This configuration is primarily used for drop or ice fishing.

Further, additional resistance to lure 1 rotation increases the faster lure 1 moves relative to the water. This is due to the spinning small blade 44, that is attached to the top eyelet 23, and the spinning small blade 34, that is attached to the bottom eyelet 31 on main shank 24. Body 3 with bait 2 attached wobbles and nutates under spinning small blade 44. Spinning small blade 44 clears the surface of body 3 at the outer extremes of the swing as body 3 nutates offering more resistance to flipping over when such resistance is needed most without restricting the nutate action. In one configuration, spinning small blade 44 rotates in a large enough circle to clang against upper surface 9 of body 3. The relative position of small blade 44 to upper surface 9 of body 3 constantly changes resulting in a sound to attract fish. Spinning small blade 44 also provides a visual benefit as it reflects light and churns the water. Further, spinning small blade 34 also provides additional resistance to rotation and visual benefit from the bottom side of lure 1. Spinning small blades 34 and 44 along with the substantially concave shaped underside 22 of the substantially spoon shaped body 3 slows the rate lure 1 drops in the water so it can be fished effectively at a wide range of speeds.

Body 3 moves loosely and slidably on main shank 24 and nutates freely when in the water with hook point 8 pointing upward where it is shielded from weeds by body 3 while fishing. Most of the fish are caught in the meatier top of the mouth because point 8 of jig hook 7 secured to body 3 points approximately upward and forward while lure 1 is in the water being fished resulting in a higher percentage of fish being landed that are hooked. Prior art lures have not overcome the problem of the lure flipping over with the artificial bait attached when fished at fast speeds in fast water currents. Lure 1 solves these problems. The compactness of lure 1 adds to it's effectiveness due to the short combined overall length with bait 2 attached. Lure 1 is compact because the overall length is not significantly increased when the artificial bait is added to lure 1 because the bait can be slid forward onto the hook as shown in FIG. 1. The lure can be used for all types of fishing, e.g. bait casting, spinning, fly fishing or jigging and trolling in fresh water and offshore salt water. The embodiment of the artificial fishing lure attracts the fish and allows the person fishing the lure, to control the action, to simulate natural bait.

There is a wide array of types and sizes of artificial baits 2 available so a number of different lure 1 sizes are needed to fish all of them. Lure 1 that is used for fly fishing and spinning for pan fish and ice fishing is smaller and doesn't require all of the beads and the components attached to shank assembly 40.

Lure 1 nutates and wobbles but is not permitted to flip over and twist. Shank 24 prohibits lure 1 from continuously flipping when pulled through the water. The spoon shaped body pivots back and forth with respect to shaft 24 based on the size and shape of depression 20. In one embodiment, bead 27 and bead 29 allow lure 1 to move back and forth between limits where lure 1 is stopped from flipping over.

Various modifications of this invention will be apparent to those skilled in the art. Thus, the scope of the invention is to be limited only by the appended claims.

The invention claimed is:

1. A fishing lure comprising:
    a spoon-shaped body having a forward end and a rear end;
    the spoon-shaped body having a convex upper surface;
    a hook extending rearwardly from the rear end of the spoon-shaped body; the hook being rigidly and non-pivotably connected to the spoon-shaped body; and
    a shank extending loosely through the spoon-shaped body; the shank having a longitudinal axis; the shank having an upper end and a lower end; the spoon-shaped body being disposed between the upper and lower ends of the shank with the upper end of the shank being disposed above the convex upper surface of the body and the lower end of the shank being disposed below the spoon-shaped body such that the spoon-shaped body nutates with respect to the longitudinal axis of the shank when the spoon-shaped body is pulled through the water by the upper end of the shank.

2. The fishing lure of claim 1, further comprising a first spinning blade connected to the upper end of the shank.

3. The fishing lure of claim 2, further comprising a second spinning blade connected to the lower end of the shank.

4. The fishing lure of claim 1, wherein the hook has a hook point that points forward at the body.

5. The fishing lure of claim 1, further comprising at least a first bead slidably disposed on the shank; the first bead being adapted to engage the body when the lure is pulled through the water to allow the body to nutate against the first bead.

6. The fishing lure of claim 5, further comprising a second bead slidably disposed on the shank; the body disposed between the first and second beads such that the body will nutate against both beads when pulled through the water by the upper end of the shank.

7. The fishing lure of claim 1, further comprising a conical bead disposed on the shank under the body wherein the conical bead is disposed between the lower end of the shank and the spoon-shaped body to allow the body to nutate against the conical bead.

8. The fishing lure of claim 1, wherein the forward end of the body is wider than the rear end of the body; the forward end of the body defines an opening.

9. The fishing lure of claim 1, wherein the body has a lower surface; the lower surface of the rear end of the body is concave; a portion of the hook being disposed in the concave portion of the rear end adjacent the lower surface of the body.

10. The fishing lure of claim 9, wherein the rear end of the body further defines an indented depression in the concave portion of the rear end; a portion of the hook being disposed in the indented depression.

11. The fishing lure of claim 1, wherein the hook has a hook point that points at a portion of the shank.

12. A fishing lure comprising:
    a spoon-shaped body having a forward end and a rear end;
    the spoon-shaped body having a convex upper surface;
    a hook extending rearwardly from the rear end of the spoon-shaped body; the hook being rigidly and non-pivotably connected to the spoon-shaped body;
    the hook having a hook shank extending rearwardly from the rear end of the body;
    a shank extending loosely through the spoon-shaped body; the shank having a longitudinal axis; the shank having an upper end and a lower end; the spoon-shaped body being disposed between the upper and lower ends of the shank with the upper end of the shank being disposed above the convex upper surface of the body and the lower end of the shank being disposed below the spoon-shaped body such that the spoon-shaped body nutates with respect to the longitudinal axis of the shank when the spoon-shaped body is pulled through the water by the upper end of the shank; and
    a retaining wire disposed alongside a portion of the hook shank; the retaining wire having an exposed tip adapted to engage and retain an artificial bait.

13. The fishing lure of claim 12, wherein the retaining wire has an upwardly disposed tip.

14. A fishing lure comprising:
a spoon-shaped body having a forward end and a rear end;
the spoon-shaped body having a convex upper surface;
a hook extending rearwardly from the rear end of the spoon-shaped body; the hook being rigidly and non-pivotably connected to the spoon-shaped body;
a shank extending loosely through the spoon-shaped body; the shank having a longitudinal axis; the shank having an upper end and a lower end; the spoon-shaped body being disposed between the upper and lower ends of the shank with the upper end of the shank being disposed above the convex upper surface of the body and the lower end of the shank being disposed below the spoon-shaped body such that the spoon-shaped body nutates with respect to the longitudinal axis of the shank when the spoon-shaped body is pulled through the water by the upper end of the shank;
the body defining a lower edge; the lower edge of the body being disposed in a reference plane; and the rear end of the body being disposed at an obtuse angle with respect to the reference plane that includes the lower edge of the body.

15. A fishing lure comprising:
a spoon-shaped body having a forward end and a rear end; the forward end being wider than the rear end;
the spoon-shaped body having an upper surface and a lower surface; the upper surface being convex and the lower surface being concave;
a hook extending rearwardly from the rear end of the spoon-shaped body; the hook being rigidly and non-pivotably connected to the spoon-shaped body;
a shank extending loosely through the spoon-shaped body; the shank having an upper end and a lower end with the spoon-shaped body being disposed between the upper and lower ends of the shank; the shank having a longitudinal axis and being in the form of a single rod that is straight between the upper and lower ends of the shank; the body nutating about the longitudinal axis of the shank when the lure is pulled through the water by the upper end of the shank;
the hook including a hook shank and a jig hook eye connected to the hook shank;
the jig hook eye being rigidly connected to the hook shank;
the hook also having a pointed hook that points at the convex upper surface of the spoon-shaped body;
the jig hook eye being disposed above the upper surface of the body with a portion of the hook shank being disposed below a portion of the spoon-shaped body; and
the jig hook eye defining an opening that is accessible to the user for attaching a line such that the lure may be fished in a vertical jigging manner.

16. The fishing lure of claim 15, wherein the spoon-shaped body defines an opening that receives the shank; the body being tilted upward immediately behind the opening and the body being tilted downward immediately in front of the opening; the tilted body angling the shank forward with respect to the body.

17. A fishing lure comprising:
a spoon-shaped body having a forward end and a rear end;
the body defining a lower edge;
the body defining a convex upper surface and a concave lower surface;
a hook extending rearwardly from the rear end of the spoon-shaped body;
the hook extending at a fixed obtuse angle with respect to the lower edge of the spoon-shaped body;
the hook being rigidly and non-pivotably connected to the spoon-shaped body;
the hook including a hook shank, a hook point connected to the hook shank, and a jig hook eye connected to the hook shank; the rear end of the spoon-shaped body being disposed between the jig hook eye and the hook shank;
the jig hook eye being disposed above the upper surface of the body with a portion of the hook shank being disposed below a portion of the spoon-shaped body;
the jig hook eye, the hook shank, and the hook point being a single, integrally-fabricated piece of metal; with a portion of the hook shank being soldered to the rear end of the body to secure the hook to the body;
the jig hook eye engaging the convex upper surface of the spoon-shaped body;
the jig hook eye defining an opening that is accessible to the user for attaching a line such that the lure may be fished in a vertical jigging manner; and
the hook point facing the convex upper surface of the spoon-shaped body.

18. The fishing lure of claim 17, further comprising a retaining wire disposed alongside a portion of the hook shank; the retaining wire having an exposed tip adapted to engage and retain an artificial bait.

19. The fishing lure of claim 18, wherein the retaining wire has an upwardly disposed tip.

20. The fishing lure of claim 17, wherein the rear end of the body is disposed at an obtuse angle with respect to the lower edge of the body.

21. The fishing lure of claim 17, wherein the rear end of the body is concave; a portion of the hook being disposed in the concave portion of the rear end.

22. The fishing lure of claim 21, wherein the rear end of the body further defines an indented depression in the concave portion of the rear end; a portion of the hook being disposed in the indented depression.

23. A fishing lure comprising:
a spoon-shaped body having a forward end and a rear end;
the spoon-shaped body having a convex upper surface and a concave lower surface;
a hook rigidly and non-pivotably connected to the rear end of the spoon-shaped body;
the hook pointing at the convex upper surface of the spoon-shaped body;
a shank extending loosely through the spoon-shaped body; the shank having an upper end and a lower end; the spoon-shaped body being disposed between the upper and lower ends of the shank; and
the spoon-shaped body defining an opening that receives the shank; the body being tilted upward immediately behind the opening and the body being tilted downward immediately in front of the opening to form a concave depression immediately in front of the opening such that the curve of the body is non-continuous at the opening; the shank being received in the tilted body portions to angle the shank forward with respect to the body such that the upper end of the shank is disposed forward of the lower end of the shank.

24. The fishing lure of claim 23, wherein the body has a lower edge; the rear end of the body is disposed at an obtuse angle with respect to the lower edge of the body.

25. The fishing lure of claim 23, wherein the front end of the spoon-shaped body defines an opening.

26. The fishing lure of claim 25, wherein the front end of the spoon-shaped body is flattened around the opening.

27. The fishing lure of claim 23, further comprising a bead connected to the shank; the bead being seated in one of the tilted body portions when the lure is pulled through the water.

28. A fishing lure comprising:
a spoon-shaped body having a forward end and a rear end; the forward end being wider than the rear end;
the spoon-shaped body having a convex upper surface and a concave lower surface;
a hook rigidly and non-pivotably connected to the rear end of the spoon-shaped body;
the hook pointing at the convex upper surface of the spoon-shaped body;
a shank extending loosely through the spoon-shaped body; the shank having an upper end and a lower end; the spoon-shaped body being disposed between the upper and lower ends of the shank;
the spoon-shaped body defining an opening that receives the shank; the body being tilted upward behind the opening and the body being tilted downward in front of the opening to form a concave depression in front of the opening such that the curve of the body is non-continuous at the opening; the shank being received in the tilted body portions to angle the shank forward with respect to the body;
a first bead connected to the shank; the first bead being seated against the upper surface of the body in the concave depression in front of the opening; and
a second bead connected to the shank; the second bead being seated against the lower surface of the body in the upward tilted portion of the body; the spoon-shaped body being able to nutate with respect to the shank against the first and second beads.

29. A fishing lure comprising:
a spoon-shaped body having a forward end and a rear end; the forward end being wider than the rear end; the spoon-shaped body having a wide area disposed intermediate the forward end and the rear end of the body; the spoon-shaped body having a convex upper surface and a concave lower surface;
a hook rigidly and non-pivotably fixed to the rear end of the spoon-shaped body;
the hook having integrally-formed jig hook eye, a hook shank, and a hook point;
the jig hook eye defining an opening that is accessible to a user for attaching a line such that the lure can be fished in a vertical jigging manner; the jig hook eye being positioned above the upper surface of the spoon-shaped body between the rear end of the body and the wide area of the body; the hook point pointing forwardly at a portion of the shank;
the rear end of the body being disposed between the jig hook eye and a portion of the hook shank; a portion of the hook shank being securely connected to the rear end of the body to secure the hook to the body;
a shank extending loosely through the spoon-shaped body at the wide area of the body; the shank having a longitudinal axis and an upper end and a lower end; the spoon-shaped body being disposed between the upper and lower ends of the shank;
a first bead slidably connected to the shank between the upper surface of the spoon-shaped body and the upper end of the shank;
a second bead slidably connected to the shank between the lower surface of the spoon-shaped body and the lower end of the shank;
the spoon-shaped body being able to nutate with respect to the longitudinal axis of the shank between the first and second beads when the lure is pulled through the water by the upper end of the shank.

30. The fishing lure of claim 29, wherein the shank is in the form of a straight rod between its upper and lower ends.

31. The fishing lure of claim 29, wherein the spoon-shaped body defines a hook opening that receives a portion of the hook shank; the jig eye having an outer diameter that is larger than the hook opening defined by the body.

32. The fishing lure of claim 29, wherein the spoon-shaped body defines an opening that receives the shank; the body being tilted upward immediately behind the opening and the body being tilted downward immediately in front of the opening to form a concave depression in front of the opening such that the curve of the body is non-continuous at the opening; the shank being received in the tilted body portions to angle the shank forward with respect to the body;
the first bead being seated against the upper surface of the body in the concave depression in front of the opening; and
the second bead being seated against the lower surface of the body in the upward tilted portion of the body; the spoon-shaped body being able to nutate with respect to the shank against the first and second beads.

\* \* \* \* \*